United States Patent
Pismenny et al.

(10) Patent No.: US 12,556,486 B2
(45) Date of Patent: Feb. 17, 2026

(54) PACKET SEQUENCING

(71) Applicant: MELLANOX TECHNOLOGIES, LTD., Yokneam (IL)

(72) Inventors: Boris Pismenny, Lausanne (CH); Liran Liss, Atzmon-Segev (IL); Omri Kahalon, Tel Aviv (IL); Eliav Bar-Ilan, Or Akiva (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 140 days.

(21) Appl. No.: 18/187,119

(22) Filed: Mar. 21, 2023

(65) Prior Publication Data

US 2024/0323133 A1 Sep. 26, 2024

(51) Int. Cl.
*H04L 47/34* (2022.01)
*H04L 47/2483* (2022.01)

(52) U.S. Cl.
CPC .......... *H04L 47/34* (2013.01); *H04L 47/2483* (2013.01)

(58) Field of Classification Search
CPC ......... H04L 12/56; H04L 47/10; H04L 12/66; H04L 69/02; H04L 69/22
See application file for complete search history.

(56) References Cited

U.S. PATENT DOCUMENTS

| | | | |
|---|---|---|---|
| 8,520,529 B2* | 8/2013 | Hutchison | H04L 47/624 370/241 |
| 9,787,612 B2 | 10/2017 | Steele et al. | |
| 10,002,096 B1 | 6/2018 | Wentzlaff | |
| 10,110,518 B2 | 10/2018 | Borshteen et al. | |
| 10,387,358 B2 | 8/2019 | Oved | |
| 2014/0056307 A1* | 2/2014 | Hutchison | H04L 12/56 370/394 |
| 2021/0051117 A1* | 2/2021 | Yoshida | H04L 49/9015 |
| 2021/0297343 A1* | 9/2021 | Vegesna | H04L 43/16 |
| 2022/0217092 A1* | 7/2022 | Hou | H04L 47/34 |
| 2023/0176769 A1 | 6/2023 | Shalom et al. | |
| 2023/0261973 A1* | 8/2023 | Jennings | H04L 49/506 370/389 |
| 2023/0300045 A1* | 9/2023 | Harrod | H04L 43/12 709/224 |

OTHER PUBLICATIONS

Ghasemirahni et al. "Packet Order Matters! Improving Application Performance by Deliberately Delaying Packets," Proceedings of the 19th USENIX Symposium on Networked Systems Design and Implementation, Apr. 4-6, 2022, pp. 807-827.
Geng et al. "Juggler: A Practical Reordering Resilient Network Stack for Datacenters," Proceedings of the Eleventh European Conference on Computer Systems, 2016, 16 pages.

* cited by examiner

*Primary Examiner* — Chirag R Patel
(74) *Attorney, Agent, or Firm* — Sheridan Ross P.C.

(57) ABSTRACT

An accelerator device and system are described, among other things. An illustrative system is disclosed to include a first sequencer programmed to append packets with information identifying a sequence number and an identification of a flow with which each packet is associated. The appended information may be used by a second sequencer to resequence the packets.

20 Claims, 9 Drawing Sheets

PACKET SEQUENCING

FIELD

The present disclosure is generally directed to systems, methods, and devices for processing data packets and, in particular, providing sequencing for multi-core processing of packets.

BACKGROUND

Today's users of computers rely on computer networks for performing a variety of tasks, from creating and implementing Artificial Intelligence (AI) models to handling large amounts of data. Thanks to multi-core accelerator technologies, computing devices such as servers and desktop computers can offload process-heavy computations to other devices to accelerate data processing tasks.

SUMMARY

Embodiments of the present disclosure relate to the sequencing and resequencing of packets. Using the disclosed systems and methods, information relating to packets in flows can be created and used at a later time to reorder the packets such that the flows are maintained in the original order.

Acceleration refers to the process of using specialized hardware to offload computationally intensive tasks from the main processor of a system, to improve overall system performance. A computing system, such as a server, may include a host core and an accelerator, such as a DPU. The accelerator may include a plurality of cores. While each individual core of an accelerator may be less powerful than the host core, the multiple cores of the accelerator working in parallel may be capable of handling packets more quickly than the host core working alone. As such, the multiple cores in a DPU can be used to accelerate a wide variety of tasks, such as data compression and decompression, cryptography, and machine learning.

For example, in a network application, a DPU with multiple cores might be used to accelerate packet processing. When a packet arrives at the network interface, the DPU can use its hardware acceleration engines to perform tasks such as packet inspection, filtering, and forwarding, without burdening the host processor of the system. This offloading of packet processing to the DPU can free up resources on the host processor, allowing the host processor to focus on other tasks and improving overall system performance.

However, because each core of an accelerator may use a slightly different amount of time to process each packet, using multiple cores to process a single ordered flow can result in the packets becoming mis-ordered. For this reason, offloading packets to multiple cores for processing can negatively result in the mis-ordering of packets which can cause issues such as congestion controller confusion.

Packet misordering is a phenomenon that can occur when packets are transmitted through a network and arrive at their destination out of order. Packet misordering can happen due to packets taking different paths through a network device such as a DPU, particularly when the device includes multiple cores used to handle packets.

Packet misordering can be unacceptable in networking because it can negatively impact network performance and cause congestion control systems to misbehave. When packets arrive out of order, the packets may need to be re-ordered before they can be processed or forwarded to their final destination, which can cause additional delays and increase packet loss. Also, a protocol stack on a host device may not be well-suited for packet reordering.

Packet misordering is particularly problematic for acceleration techniques, such as DPUs, TCP/IP offload engines (TOEs) and network interface cards (NICs), which may be used to optimize network performance. Destination devices used in relation with these acceleration technologies may rely on an assumption that packets will arrive after acceleration in the order the packets were sent, and therefore may not be able to handle packet reordering efficiently. This can cause a bottleneck in the network due to congestion controller confusion and result in degraded performance.

Congestion control algorithms are designed to regulate the rate at which packets are transmitted in order to avoid congestion in the network. When packets arrive out of order, congestion control algorithms may incorrectly interpret the misordering as an indication of congestion or the loss of a packet and reduce the transmission rate, even though the network may not actually be congested and/or the packet may not have been lost. Packets arriving out of order can result in reduced network throughput and increased latency.

Because packet misordering due to acceleration is unacceptable as it may cause a congestion controller of the DPU to misbehave, conventional systems may in some instances be limited to using a single core to process a single ordered flow.

The disclosed systems and methods enable the use of multiple cores to process one or more flows while maintaining ordering via a new software-hardware interface. As described in greater detail below, a software-hardware interface enables software to specify a sequence number which hardware uses to order packets such that the incoming order is maintained at output. Incoming packets are assigned sequence numbers before being spread among a number of cores via a scheduling policy, such as round-robin. For instance, the sequence number may be provided to software by hardware that is distributing packets among the cores, and then hardware will reassemble the flow after processing.

As described herein, a hardware service includes two parts: on receive, ordering metadata is generated and assigned to packets; and on transmit, the ordering metadata is used to reorder the packets. A hardware solution as described herein performs sequencing and resequencing in a more efficient manner as compared to a software solution. Using software instead of hardware can create bottleneck issues which are avoided by the hardware solution provided herein.

Embodiments include a multi-core processing system, the system comprising: a first hardware sequencer that: identifies a flow order for a plurality of received packets; and generates metadata for at least some of the plurality of received packets based on the identified flow order, the metadata indicating a sequence number for a respective packet; a hardware sprayer that distributes the plurality of received packets among a plurality of processing cores; and a second hardware sequencer that: receives packets from the plurality of processing cores; and sequences the packets based on the metadata generated by the first hardware sequencer.

Aspects of the above system include wherein the received packets are generated by software executed by the system. Aspects of the above system include wherein the first hardware sequencer sequences the plurality of received packets. Aspects of the above system include wherein the first hardware sequencer is programmed to identify flows based on data in each packet. Aspects of the above system include wherein the metadata further indicates a flow associated with the respective packet. Aspects of the above system include wherein the second hardware sequencer sequences packets with metadata indicating a particular flow and does not sequence packets without metadata indicating the particular flow. Aspects of the above system include wherein the metadata further indicates the first hardware sequencer. Aspects of the above system include wherein the second hardware sequencer sequences packets with metadata indicating the first hardware sequencer and does not sequence packets without metadata indicating the first hardware sequencer. Aspects of the above system include wherein the packets received by the second hardware sequencer were sent to the plurality of processing cores by a plurality of hardware sequencers, wherein each packet identifies a respective hardware sequencer. Aspects of the above system include wherein the second hardware sequencer sequences packets with metadata indicating the first hardware sequencer separate from packets with metadata indicating a hardware sequencer other than the first hardware sequencer. Aspects of the above system include wherein the sprayer distributes the plurality of received packets across the plurality of processing cores. Aspects of the above system include wherein the second hardware sequencer outputs the first packet to a host device.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

The present disclosure is described in conjunction with the appended figures, which are not necessarily drawn to scale.

DETAILED DESCRIPTION

Figure 1:
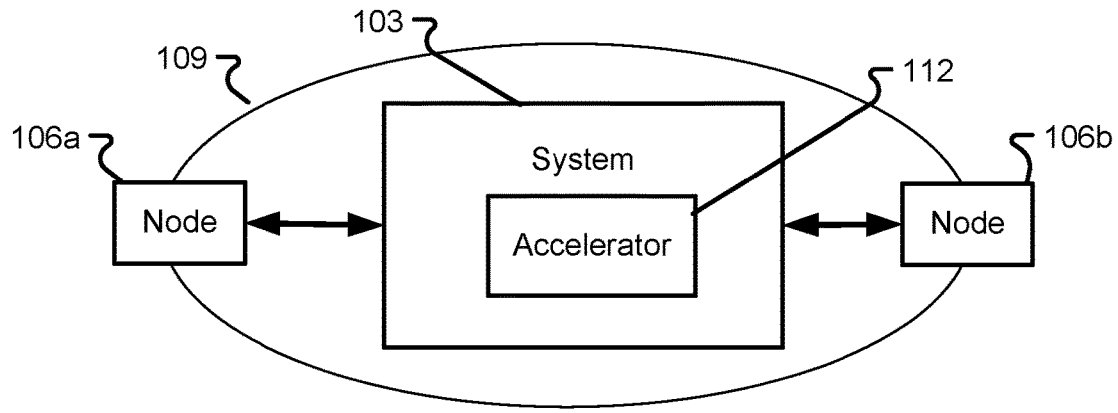
FIG. 1 is a block diagram of a networking environment in accordance with one or more of the embodiments described herein.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The details of one or more aspects of the disclosure are set forth in the accompanying drawings and the description below. Other features, objects, and advantages of the techniques described in this disclosure will be apparent from the description and drawings, and from the claims.

The phrases "at least one," "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Numerous additional features and advantages are described herein and will be apparent to those skilled in the art upon consideration of the following Detailed Description and in view of the figures.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It will be appreciated from the following description, and for reasons of computational efficiency, that the components of the system can be arranged at any appropriate location within a distributed network of components without impacting the operation of the system.

Further, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Any of the steps, functions, and operations discussed herein can be performed continuously and automatically.

The exemplary systems and methods of this disclosure have been described in relation to a network of switches; however, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving case, and/or reducing cost of implementation.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or a class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

As illustrated in FIG. 1A, a computing environment may comprise a network 109 which may be used to interconnect multiple nodes 106a, 106b, such as computers, servers, memory devices, etc. The network 109 may also comprise a number of switches or other network devices. The network 109 also comprises a system 103 as described in greater detail below. Additionally, while not illustrated in FIG. 1A, multiple networks 109 may be connected together, allowing for communication between different networks 109.

Using a system 103 or method as described herein, a multi-core accelerator 112 may be enabled to process one or more flows of packets without incurring the mis-ordering which plagues conventional systems.

The present disclosure involves the use of a sequencer to append information to packets prior to the packets being processed by cores of the accelerator. After processing, the information can be used to ensure the packets are output from the accelerator in the proper order. The systems and methods described herein enable the use of multiple cores to process a flow of packets without resulting in a mis-ordering of the packets.

As described herein, new sequencing and resequencing mechanisms may be used to record a sequence number and/or a flow identifier for packets in a flow and to use the recorded sequence number and/or flow identifier to reorder the packets of the flow in the event that the packets are or may be mis-ordered, such as following the packets being processed using a multiple cores. Using a system as described herein, processes can be accelerated by processing packets with multiple cores while avoiding the risk of the packets being mis-ordered.

The systems and methods described herein enable a variety of use cases. As illustrated in FIG. 1A, in some embodiments, network devices or nodes 106a, 106b, of a network 109 can offload tasks to a network-connected system 103. For example, packets may be sent from a first node 106a to a system 103 as described herein via a network 109. The packets may have destination addresses associated with a second node 106b. The system 103 may comprise an accelerator 112 or other multi-core system capable of processing packets sent to and from the nodes 106a, 106b.

A system may receive packets through a network interface which connects the system 103 to the network 109. When a packet arrives at the network interface, the packet may be processed by a network driver or other software system which manages the communication between the network interface and an operating system of the system 103. The system 103 may receive packets from various sources, such as other systems on the same network, nodes 106a, 106b, or from the internet.

Figure 2:
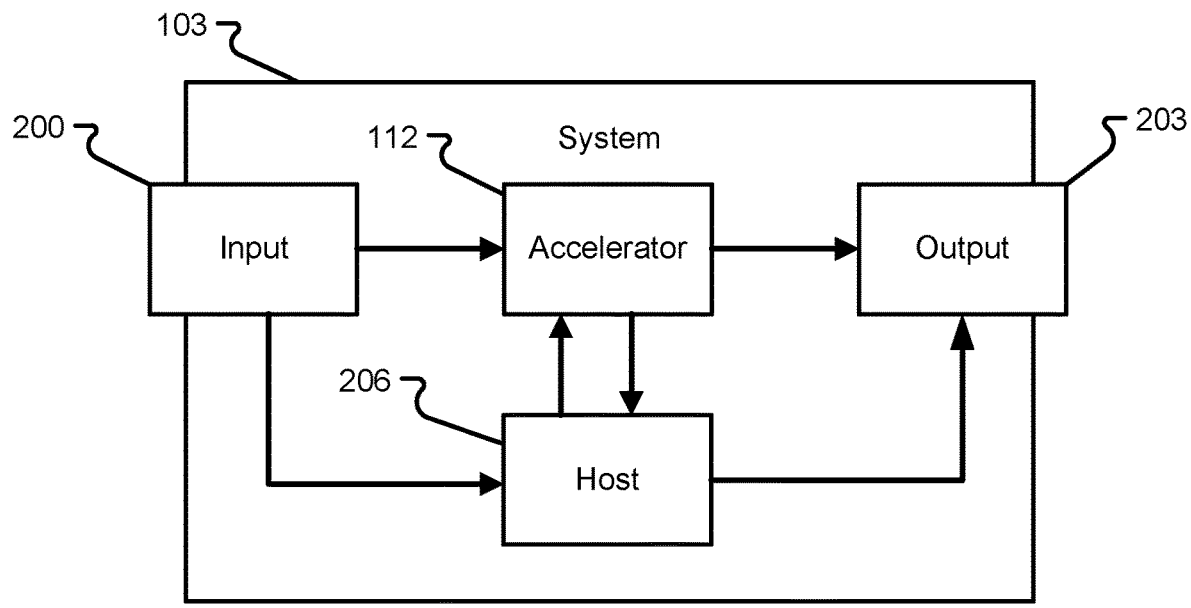
FIG. 2 is a block diagrams of a system in accordance with one or more of the embodiments described herein.

In some embodiments, a host 206 of a system 103 as illustrated in FIG. 2 can offload processes to an accelerator 112 on the same system 103 as the host 206. The system 103 may comprise an input 200 capable of receiving packets and other data and an output 203 capable of transmitting packets and other data. A host 206 of the system 103 may be a processor such as a central processing unit (CPU) or other device. The host 206 may in some embodiments, send and receive packets of data via the input 200 and output 203. The host 206 may be capable of sending packets to and receiving packets from an accelerator 112. For example, the host 206 may use the accelerator 112 to execute computationally intensive processes.

The accelerator 112 may include different types of processing cores that can be used in a multi-core processing system as described herein. For example, the accelerator 112 may include general-purpose cores; application-specific cores, such as cores designed to handle specific tasks, such as encryption, compression, or digital signal processing; hardware acceleration cores designed to offload certain tasks from the main processor of a system, such as cryptography, compression, and decompression; GPU cores designed for handling graphics and other visual tasks; ARM cores based on the ARM architecture; RISC-V cores based on the RISC-V architecture; etc. In some embodiments, the cores which process the packets may be a part of a separate device from another device, such as a NIC, which performs the sequencer, sprayer, and resequencer functions described in detail below.

Figure 3:
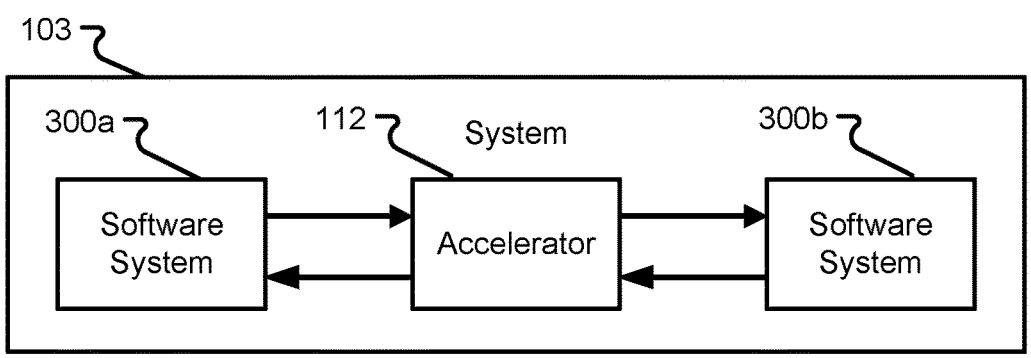
FIG. 3 is a block diagram of a system in accordance with one or more of the embodiments described herein.

In some embodiments, as illustrated in FIG. 3, software systems 300a, 300b, such as systems which may be executed by a host 206 can use an accelerator 112 or other device with multiple cores to process packets of one or more flows, etc. The accelerator 112 may be capable of sending and receiving packets from multiple software systems 300a, 300b. In some embodiments, packets may be sent to the accelerator 112 by a first software system 300a and may be sent by the accelerator 112 to a second software system 300b after processing.

Using a system 103 with an accelerator 112 as illustrated in FIGS. 1-3, any number of embodiments, such as those described herein, may be implemented to provide sequencing and resequencing of packets in flows.

Figure 4:
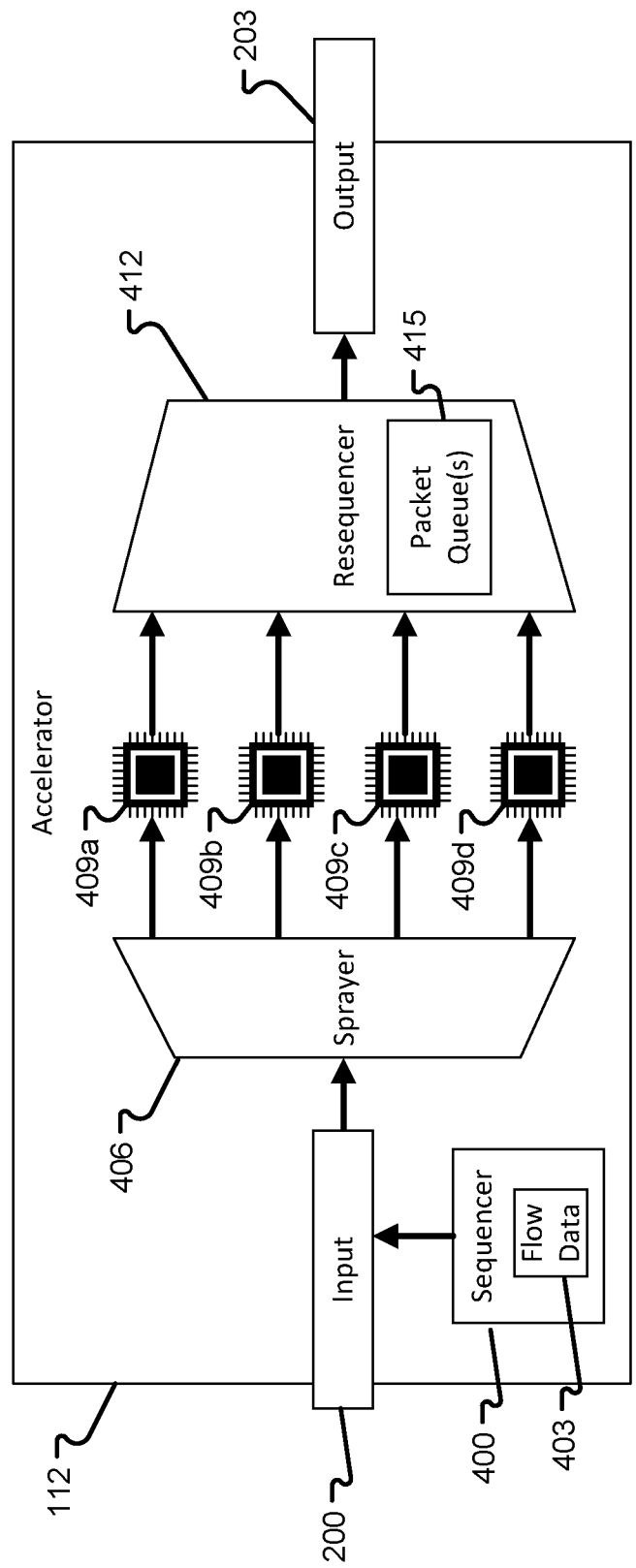
FIG. 4 is a block diagram of an accelerator in accordance with one or more of the embodiments described herein.
Figure 5:
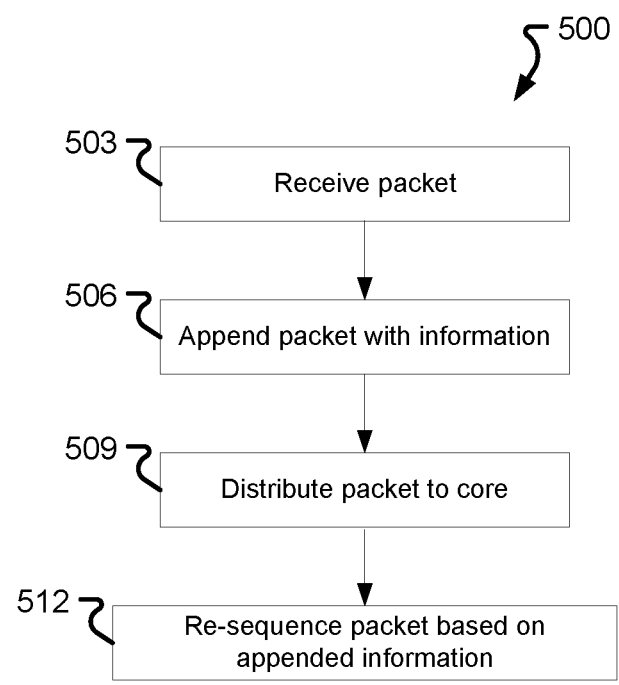
FIG. 5 is a flowchart of a method in accordance with one or more of the embodiments described herein.

Using a system 103 with an accelerator 112 as illustrated in FIGS. 1-3, any number of embodiments, such as those described herein, may be implemented to provide sequencing and resequencing of packets in flows. In accordance with one or more of the embodiments described herein, an accelerator 112 may be as illustrated in FIG. 4 and may be used to perform a method 500 as illustrated in FIG. 5.

The accelerator 112 may comprise an input 203. The input 203 of the accelerator 112 may be used to receive packets at 503. As illustrated in FIGS. 1-3, packets may be sent to the accelerator 112 from a number of sources, such as a host 206, a node 106a via a network 109, a software system 300a, an input 200 to the system 103 comprising the accelerator 112, and/or other sources capable of sending packets to an accelerator 112.

Upon receiving a packet, a sequencer 400, which may be described in greater detail below, may generate information associated with the packet and append the packet with information at 506.

Information appended to a packet by the sequencer 400 may include information indicating a flow to which the packet belongs and/or a sequence number indicating an order in which the packet was received by the accelerator 112.

In some embodiments, all packets handled by a particular sequencer 400 may be considered as a single flow. In such an embodiment, the sequencer 400 may append each packet with a number indicating an order in which the packet was received. For example, a first packet may be assigned a one, a second packet may be assigned a two, etc.

In some embodiments, an accelerator may comprise multiple sequencers 400. Each sequencer 400 may handle a different flow of packets. In such an embodiment, each sequencer 400 may assign an incoming packet with an order number and a sequencer ID identifying the sequencer which handled the packet. In this way, if the packets handled by all sequencers 400 are mis-ordered, the packets can be restored to the proper order and the flows can be re-separated. Such an embodiment is described in greater detail below in relation to FIGS. 7 and 9.

The information generated by the sequencer 400 for each packet may be appended to the respective packet in the form of metadata, header information, footer information, or other data. For example, a header of the packet may be appended to include a sequence number and/or a sequencer ID.

The packets, when received, may be in an ordered flow. In some embodiments, the sequencer 400 may be enabled to identify a flow to which a particular packet belongs. For example, and as described in greater detail below, the sequencer 400 may use flow data 403 stored in memory to inspect a received packet and to determine a flow with which the packet is associated. This flow determination may be used by the sequencer 400 to generate information to append to the received packet.

Flow may in some embodiments refer to a sequence of related data packets transmitted between two locations such as network nodes 106a, 106b. Packets that belong to the same flow may be related to each other in some way, such as having the same source and destination addresses, protocol type, or QoS requirements.

In some embodiments, flow, as used herein, may refer to all packets handled by a single sequencer. For example, two or more sequencers may each handle a separate flow of packets. The packets handled by the two or more sequencers may all be processed using a group of two or more processing cores. A resequencer, described below, may be used to regroup the packets into flows in the same order as handled by the sequencers.

Flows can be used to track and manage network traffic at a more granular level than individual packets. By grouping related packets into flows, network administrators can more analyze and manage network traffic, and apply policies and controls to specific types of traffic.

Flows can be identified and managed using a variety of techniques, such as packet inspection, flow tracking algorithms, and flow monitoring tools. Once a flow has been identified, it can be managed and monitored using a variety of techniques, such as QoS prioritization, traffic shaping, and security policies.

The correct order of packets in a flow can be critical for ensuring that data being transmitted is complete, accurate, and usable. Mis-ordering packets in a flow can result in data corruption, incomplete data, or other errors that can significantly impact the performance and reliability of network applications.

For example, in a file transfer application, mis-ordering packets can result in corrupted files or missing data, which can cause the transfer to fail or result in a file that is unusable. In a video streaming application, mis-ordering packets can result in stuttering or freezing of the video, as well as degraded image quality.

Mis-ordering packets can also impact the performance of network applications, as it can increase network latency and packet loss. When packets are mis-ordered, additional processing may be required to reorder the packets, which can increase the processing load on the system and introduce additional latency. This can result in a slowdown of network performance, increased packet loss, and reduced overall throughput.

In addition, mis-ordering packets can cause congestion control algorithms to misbehave, as the algorithms may incorrectly interpret the mis-ordering as an indication of network congestion and reduce the transmission rate, even though the network may not actually be congested. This can result in reduced network throughput and increased latency.

For these reasons, it is important to ensure that packets are not mis-ordered in a flow in order to maintain data integrity, ensure proper network performance, and provide reliable and efficient network communication.

In some embodiments, a sequencer 400 may be capable of identifying a flow with which the packet is associated based on data in each packet.

For example, upon receiving a packet, the sequencer 400 may determine if the packet belongs to a particular flow using various techniques, such as packet inspection and flow tracking. The specific technique used may depend on the application and the requirements of the network.

One technique for determining if a packet belongs to a particular flow which may be employed by a sequencer 400 is an examination of a header of each received packet. The header contains various fields that can be used to identify the packet's source and destination addresses, protocol type, and other characteristics that are specific to the flow.

For example, in a network application, such as one using the Transmission Control Protocol (TCP), each flow may be identified by a unique combination of source and destination addresses and port numbers. The sequencer 400 can examine each packet header to determine source and destination addresses and port numbers, and compare the source and destination addresses to known addresses and port numbers associated with a particular flow. If the packet's source address, destination address, port number, etc., matches the flow's source and destination addresses and/or port numbers, the packet may be considered as belonging to the flow.

In addition to packet inspection, a sequencer 400 can use flow tracking to determine if a packet belongs to a particular flow. Flow tracking involves monitoring network traffic and analyzing the patterns of packets to identify flows. Once a flow has been identified, the sequencer 400 can then associate new packets with the flow based on characteristics of the new packets.

If a packet belongs to a known flow, the packet may be given a next number in a sequence for that flow. For example, the system may keep counters which indicate a number of received packets for a given flow. If a packet is determined to not belong to any previously known flow, the packet may be given an order number of zero, for example, and a new flow may be initiated.

In some embodiments, the sequencer 400 may assign each packet a timestamp indicating a time of arrival. This timestamp may be used to identify the order of the flows and no sequence number may be required.

In some embodiments, it may not be necessary for the sequencer 400 to be capable of identifying a flow. Instead, in such an embodiment, the sequencer may treat all incoming packets the same, ordering each, such that the output of the system is ordered just as the packets were received, whether the packets relate to a single flow or to multiple flows.

The sequencer 400 may be a hardware device such as a circuit capable of performing the tasks of a sequencer as described herein.

The accelerator 112 may in some embodiments comprise a plurality of sequencers 400. In such embodiments, sequencer instances may be allocated by assigning a different ID to each sequencer 400. Steering mechanisms of the system 103 may be used to steer packets to a particular sequencer 400. Each sequencer 400 may be configured to tag each packet with a sequencer ID and sequence number.

For example, if the accelerator 112 is to be used to handle two separate flows, the system 103 may allocate two separate sequencers 400, one sequencer 400 for each flow. As long as packets indicate sequence ID and the flow or sequencer, the packets can be reordered when needed.

After being appended with information by the sequencer 400, each packet may in some embodiments be transmitted to a sprayer 406 which may distribute each packet to a core 409a-d at 509. The sprayer may be a hardware or software component that distributes packets to processing cores of the system. There are several different ways the sprayer may distribute packets to processing cores, for example:

Round-robin: In this method, the sprayer distributes packets in a circular sequence to each processing core in turn. For example, the first packet may be sent to a first core, the second packet to a second core, and so on. Once all cores have received a packet, the sequence starts again.

Hash-based: In this method, the sprayer may use a hash function to map packets to specific processing cores. The hash function may, for example, use a characteristic of the packet, such as the source or destination IP address, to generate a unique identifier for the packet. The identifier may then be used to determine which core the packet should be sent to.

Weighted: In this method, the sprayer may assign one or more weights to each processing core based on processing capacity or other characteristics. The sprayer may then use the weights to determine how many packets to send to each core. For example, a more powerful core may be assigned a higher weight, and therefore receive a greater number of packets than a less powerful core.

Queue-based: In this method, the sprayer may maintain a separate queue for each processing core. When a packet arrives, it is placed in an appropriate queue based on the processing core it should be sent to. Each processing core then reads packets from its own queue and processes them independently.

Burst-based: In this method, the sprayer may group packets into bursts and sends each burst to a single processing core. This method is particularly useful for applications that require high throughput, as it allows processing cores to operate at maximum capacity without being slowed down by processing packets from other cores.

The specific method used by the sprayer to distribute the packets to the processing cores may vary depending on the requirements of the network and the specific application being used. By distributing packets efficiently and effectively, a sprayer can help to optimize network performance and ensure reliable and efficient data transmission.

The accelerator 112 may comprise a plurality of processing cores 409a-d. Each processing core 409a-d may be an individual processing core capable of processing a packet. The cores 409a-d may be configured to handle packets in parallel, providing significant performance improvements over traditional CPU-based solutions.

The cores 409a-d used by the accelerator 112 may be optimized for a particular task. For example, an accelerator 112 designed for may use cores 409a-d based on the graphics processing unit (GPU) architecture. In some embodiments, an accelerator 112 may use cores based on the application-specific integrated circuit (ASIC) architecture. The specific cores 409a-d used by the accelerator 112 may depend on the requirements of the application and the specific task being offloaded.

The accelerator 112 may also in some embodiments comprise a second hardware sequencer, which may be referred to as a resequencer 412. The resequencer 412 may be configured to receive packets from the plurality of processing cores 409. For example, after a core 409a processes a packet, the core 409a may output the processed packet to the resequencer 412.

Each processed packet received by the resequencer 412 may contain the same information appended to the original packet by the sequencer 400. The resequencer 412 may then, at 512, resequence each packet based on the information generated by the sequencer 400.

In some embodiments, the resequencer 412 is configured to sequence packets which include metadata indicating a particular flow and not to sequence packets which do not include metadata indicating the particular flow. For example, the resequencer 412 may be programmed to sequence only packets which are associated with a particular flow or were sequenced by a particular sequencer 400.

In some embodiments, the resequencer may sequence packets which include metadata indicating the sequencer 400 which appended the packet with information and may not sequence packets which do not include metadata indicating the sequencer 400.

For example, if a packet does not include information indicating a sequencer 400 or a flow associated with the packet, the resequencer 412 may pass the packet directly to the output 203.

As another example, a resequencer 412 may be programmed to only sequence packets handled by a first sequencer 400 and to pass any other packets, whether handled by a different sequencer or not, in the which the packets were received by the resequencer 412 from the cores 409a-d.

The resequencer 412 may in some embodiments use one or more packet queues 415 to hold out of order packets until the packets are next to be output. If an out-of-order packet is received by the resequencer 412 prior to a packet with an earlier sequence number, the out-of-order packet may be held in a packet queue 415 until all prior packets have been received and transmitted. As described below, other rules may be established for handling out-of-order packets or missing packets.

The resequencer 412 may next output packets via an output 203 of the accelerator 112. For example, the resequencer 412 may output the packets to a host 206 of the system 103, to an external node 106a, 106b, via an output 203 of the system 103, and/or to one or more software systems 300a, 300b executed by a processor of the system 103.

In some embodiments, the resequencer 412 may output flows separately. For example, the resequencer 412 may sequence packets with metadata indicating a first sequencer 400 separate from packets with metadata indicating a second sequencer 400 other than the first sequencer 400. The flows may be output separately via different outputs 203 or may be output together via one output 203. Such embodiments are described in greater detail below.

In certain instances, an expected packet may not be received by the resequencer 412. For example, a packet may become missing or may be stalled indefinitely. In the event that an expected packet is not received by the resequencer 412, the resequencer 412 may be programmed to one or more of raise an error state, drop out-of-order packets, wait a given amount of time, e.g., 3 microseconds, before continuing without the packet, etc. If the resequencer 412 continues without the packet and later receives the packet, the resequencer 412 may be programmed to send the packet when it is received, thus making a best effort attempt, or to drop the packet.

FIGS. 6-9 illustrate a number of embodiments in accordance with various embodiments of the present disclosure in which one or more flows are handled by an accelerator 112.

In FIGS. 6-12, packets are labeled P0-P9 and Q0-Q7 for illustration purposes. The label letters indicate the flow with which each packet is associated and the label numbers indicate the sequence number, or the order in which each packet was received within the flow associated with the packet. For example, for flow P, packet P0 is received first, followed by P1, P2, P3, P4, P5, P6, P7, and P8, and ending with P9. For flow Q, packet Q0 is received first, followed by Q1, Q2, Q3, Q4, Q5, Q6, Q7, and Q8, and ending with Q9. An apostrophe following a packet label, e.g., P0', indicates the packet has been appended with information by a sequencer 400, or, in the example described below in relation to FIG. 10, by a software system 1003a, 1003b.

Figure 6:
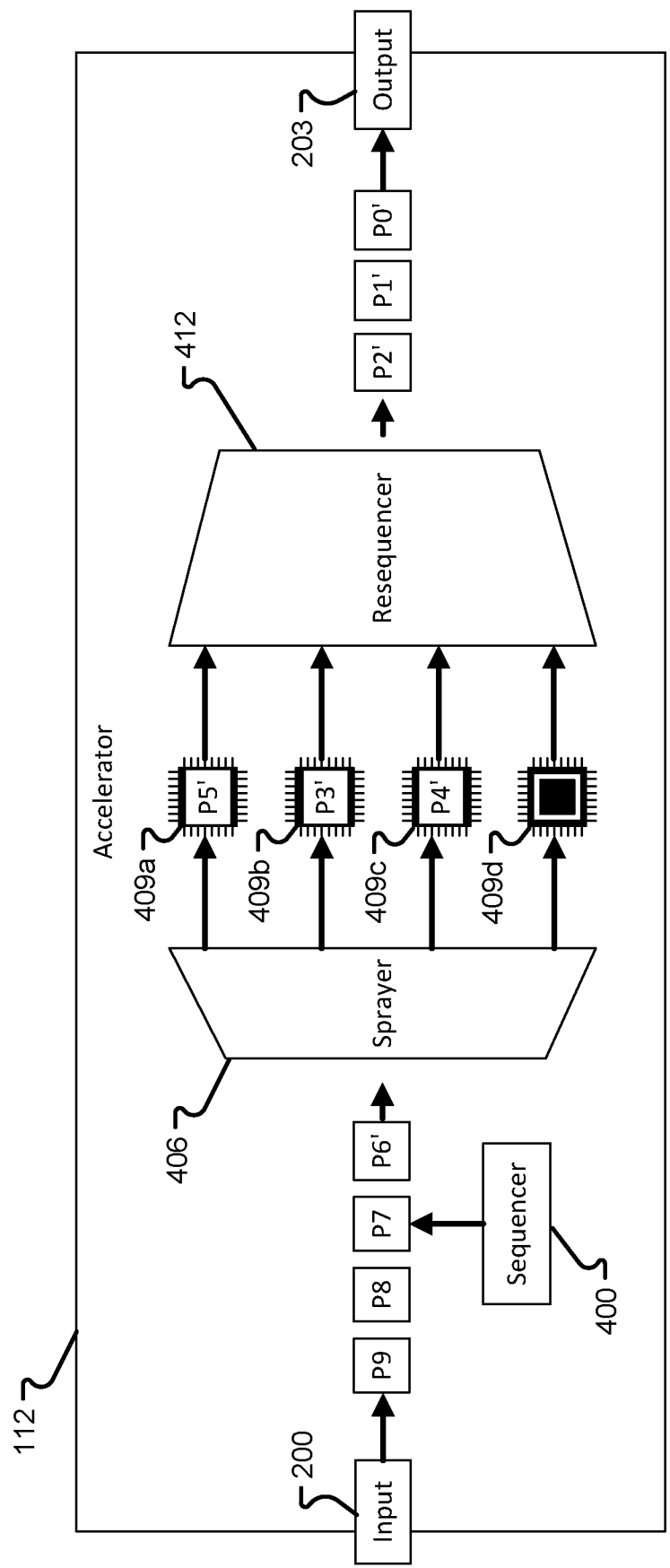
FIG. 6 is a block diagram of an accelerator in accordance with one or more of the embodiments described herein.

In FIG. 6, an accelerator 112 comprises a single sequencer 400 and an input 203 of a single flow P. The accelerator 112 provides a single output 203. As the packets are received by the accelerator 112 from the input 203, the sequencer appends each with information indicating one or more of an order in which the packet was received and the sequencer 400 which handled the packet. For example, the sequencer 400 may, because the sequencer 400 is the only sequencer 400 of the accelerator 112, append each packet with a number indicating the order in which the packets were received.

After processing by the sequencer 400, each packet is handled by a sprayer 406 which directs the packet to a particular processing core 409a-d. As illustrated in FIG. 6, a first core 409a is processing a packet P5, a second core 409b is processing a packet P3, a third core 409c is processing a packet P4, and a fourth core 409d is available.

After each core 409*a-d* finishes processing each packet, the packets are resequenced by a resequencer 412. The resequencer 412 determines, based on the information appended to each packet by the sequencer 400, an order and/or a flow for each packet. In the example illustrated in FIG. 6, the resequencer 412 may simply identify an order number for each packet and output the next packet in sequence. For example, in the beginning the resequencer 412 may refuse to output P1' or P2' until P0' is received and output. After outputting P0', the resequencer 412 may hold any packets other than P1'. In this way, the packets are output from the accelerator 112 in the same order as received.

Figure 7:
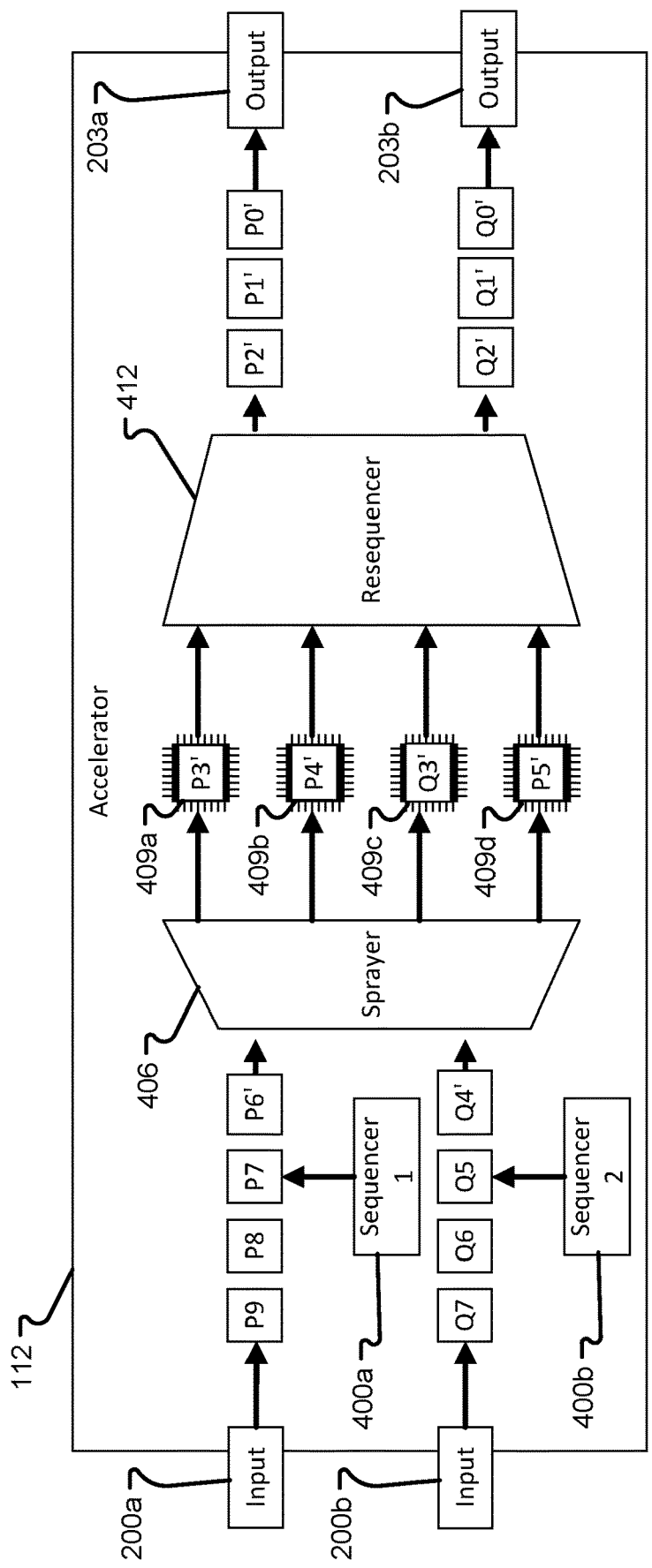
FIG. 7 is a block diagram of an accelerator in accordance with one or more of the embodiments described herein.

In FIG. 7, an accelerator 112 comprises a first sequencer 400*a* handling packets from a first input 200*a*. The packets handled by the first sequencer 400*a* may be considered as being of a single flow P. The accelerator 112 further comprises a second sequencer 400*b* handling packets from a second input 203*b*. The packets handled by the second sequencer 400*b* may be considered as being of a single flow Q. It should be appreciated that the packets of flow P may or may not be from the same source and may or may not be directed to the same destination. Similarly, it should be appreciated that the packets of flow Q may or may not be from the same source and may or may not be directed to the same destination. In some embodiments, a flow may refer to all packets handled by a particular sequencer 400, while in other embodiments, a flow may refer to packets with a common destination address, software process, or another common characteristic.

The accelerator 112 provides two outputs 203*a*, 203*b*. As the packets are received by the accelerator 112 from the inputs 200*a*, and 200*b*, the first sequencer 400*a* appends each of the packets from the first input 200*a* with information indicating an order in which the packet was received and an indicator indicating the packet was handled by the first sequencer 400*a*, and the second sequencer 400*b* appends each of the packets from the second input 200*b* with information indicating an order in which the packet was received and an indicator indicating the packet was handled by the second sequencer 400*b*.

After processing by one of the first and second sequencers 400*a*, 400*b*, each packet is handled by a sprayer 406 which directs the packet to a particular processing core 409*a-d*. As illustrated in FIG. 7, a first core 409*a* is processing a packet P3', a second core 409*b* is processing a packet P4', a third core 409*c* is processing a packet Q3', and a fourth core 409*d* is processing packet P5'.

After each core 409*a-d* finishes processing each packet, the packets are resequenced by a resequencer 412. The resequencer 412 determines, based on the information appended to each packet by the sequencer 400, an order and a flow for each packet. In the example illustrated in FIG. 7, the resequencer 412 identifies both an order number for each packet and a sequencer which handled the packet. Based on this identification, the resequencer outputs, in order, packets of the P flow to a first output 203*a* and packets of the Q flow to a second output 203*b*. For example, in the beginning the resequencer 412 may hold P1' or P2' until P0' is received and output and may hold Q1' or Q2' until Q0' is received and output. After outputting P0', the resequencer 412 may hold any packets of the P flow other than P1'. In this way, the packets are output from the accelerator 112 in the same order and the same flow as received.

Figure 8:
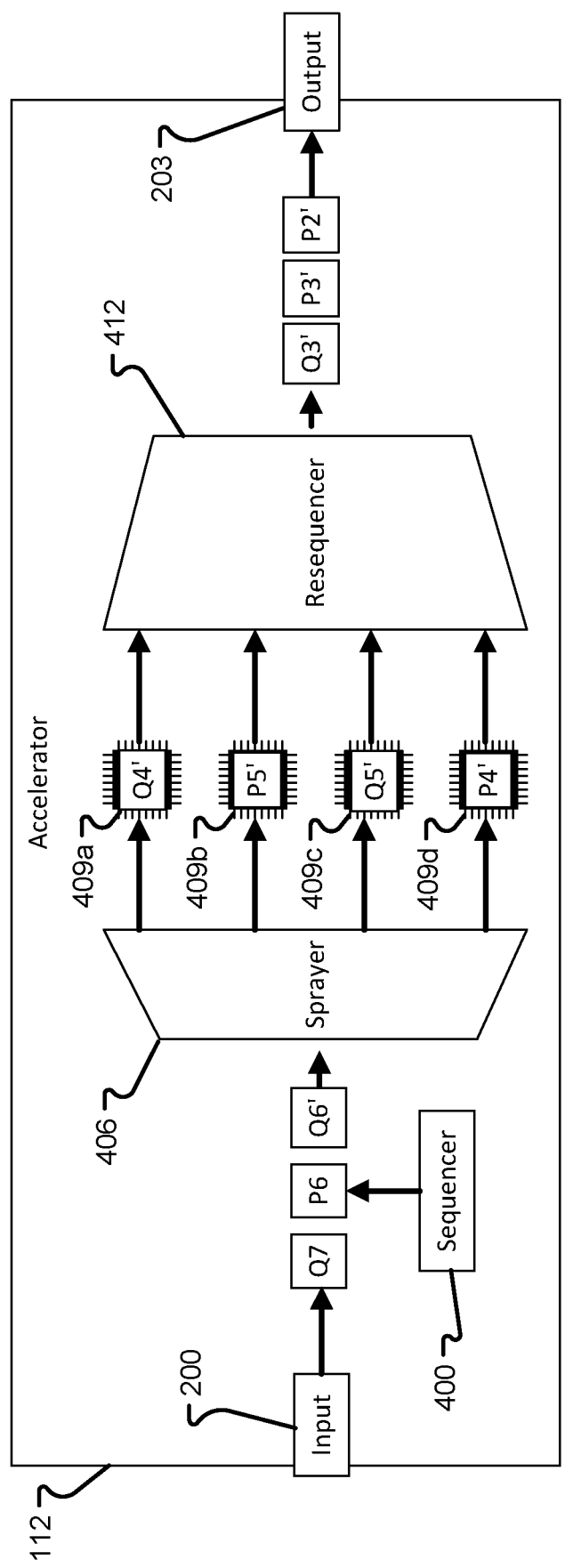
FIG. 8 is a block diagram of an accelerator in accordance with one or more of the embodiments described herein.

In FIG. 8, an accelerator 112 comprises a single sequencer 400 and an input 203 providing two flows, P and Q. The accelerator 112 provides a single output 203. As the packets of flows P and Q are received by the accelerator 112 from the input 203, the sequencer 400 appends each with information indicating an order in which the packet was received and the flow associated with the packet. The sequencer 400 may, for each packet, determine whether the packet is associated with flow P or flow Q and append each packet with a number indicating the order in the flow in which the packets were received. For example, the first packet received for flow P may be appended with a flow identifier of P and an order number of zero and the first packet received for flow Q may be appended with a flow identifier of Q and an order number of zero.

After being processed by the sequencer 400, each packet is handled by a sprayer 406 which directs the packet to a particular processing core 409*a-d*. As illustrated in FIG. 8, a first core 409*a* is processing a packet Q4', a second core 409*b* is processing a packet P5', a third core 409*c* is processing a packet Q5', and a fourth core 409*d* is processing packet P4'.

After each core 409*a-d* finishes processing each packet, the packets are resequenced by a resequencer 412. The resequencer 412 determines, based on the information appended to each packet by the sequencer 400, an order and a flow for each packet. In the example illustrated in FIG. 8, the resequencer 412 identifies both an order number for each packet and a flow associated with the packet. Based on this identification, the resequencer outputs, in order, packets of the P flow and the Q flow to the output 203. For example, in the beginning the resequencer 412 may hold P1' or P2' until P0' is received and output and may hold Q1' or Q2' until Q0' is received and output. After outputting P0', the resequencer 412 may hold any packets of the P flow other than P1'. In this way, the packets are output from the accelerator 112 in the same order and the same flow as received.

Figure 9:
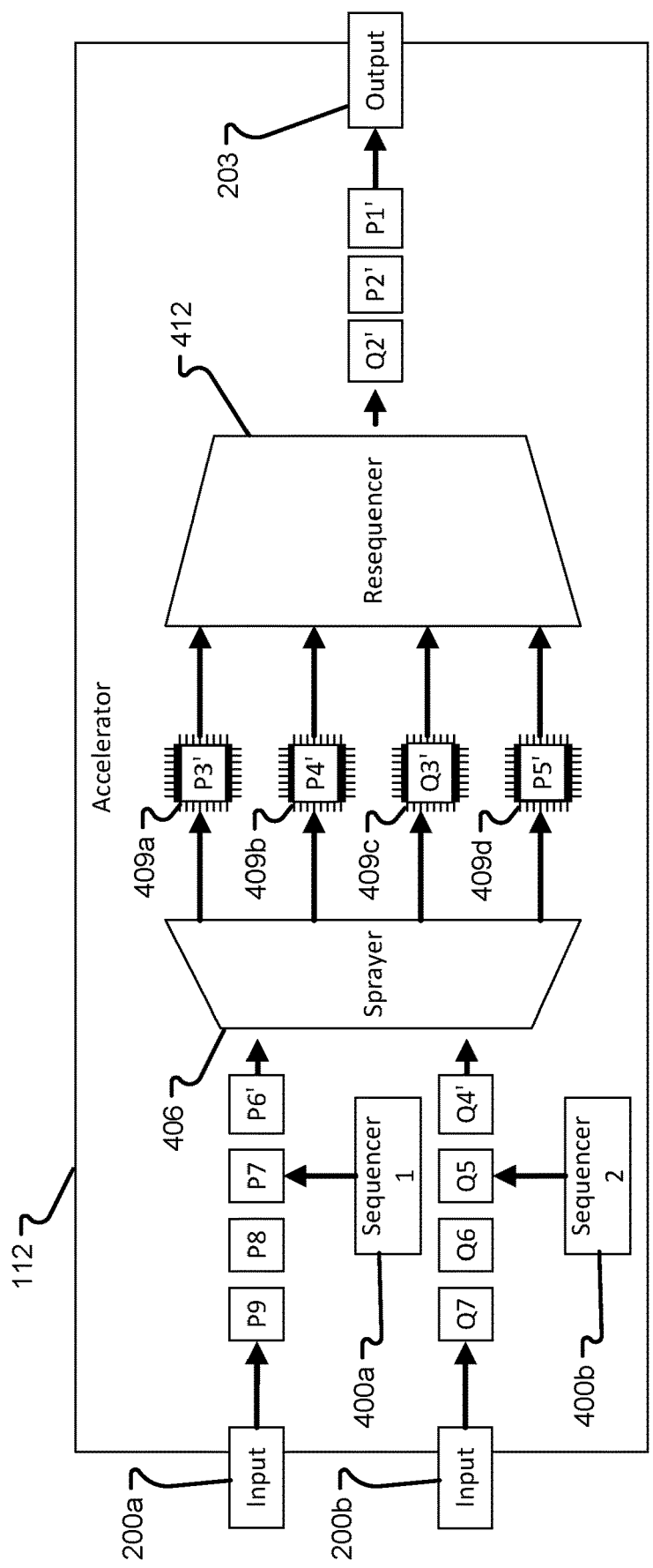
FIG. 9 is a block diagram of an accelerator in accordance with one or more of the embodiments described herein.

In FIG. 9, an accelerator 112 comprises a first sequencer 400*a* handling packets from a first input 200*a*. The packets handled by the first sequencer 400*a* may be considered as being of a single flow P. The accelerator 112 further comprises a second sequencer 400*b* handling packets from a second input 200*b*. The packets handled by the second sequencer 400*b* may be considered as being of a single flow Q. It should be appreciated that the packets of flow P may or may not be from the same source and may or may not be directed to the same destination. Similarly, it should be appreciated that the packets of flow Q may or may not be from the same source and may or may not be directed to the same destination. In some embodiments, a flow may refer to all packets handled by a particular sequencer 400, while in other embodiments, a flow may refer to packets with a common destination address, software process, or another common characteristic.

The accelerator 112 provides one output 203 which outputs the combined P and Q flows. As the packets are received by the accelerator 112 from the inputs 200*a*, and 200*b*, the first sequencer 400*a* appends each of the packets from the first input 200*a* with information indicating an order in which the packet was received and an indicator indicating the packet was handled by the first sequencer 400*a*, and the second sequencer 400*b* appends each of the packets from the second input 200*b* with information indicating an order in which the packet was received and an indicator indicating the packet was handled by the second sequencer 400*b*.

After being processed by one of the sequencers 400*a* and 400*b*, each packet is handled by a sprayer 406 which directs the packet to a particular processing core 409*a-d*. As illustrated in FIG. 9, a first core 409*a* is processing a packet P3', a second core 409*b* is processing a packet P4', a third core 409*c* is processing a packet Q3', and a fourth core 409*d* is processing packet P5'.

After each core 409*a-d* finishes processing each packet, the packets are resequenced by a resequencer 412. The resequencer 412 determines, based on the information appended to each packet by one of the sequencers 400*a* and 400*b*, an order and a flow for each packet. In the example illustrated in FIG. 9, the resequencer 412 identifies both an order number for each packet and a flow associated with the packet. Based on this identification, the resequencer outputs, in order, packets of the P flow and the Q flow to the output 203. For example, in the beginning the resequencer 412 may hold P1' or P2' until P0' is received and output and may hold Q1' or Q2' until Q0' is received and output. After outputting P0', the resequencer 412 may hold any packets of the P flow other than P1'. In this way, the packets are output from the accelerator 112 in the same order and the same flow as received.

Figure 10:
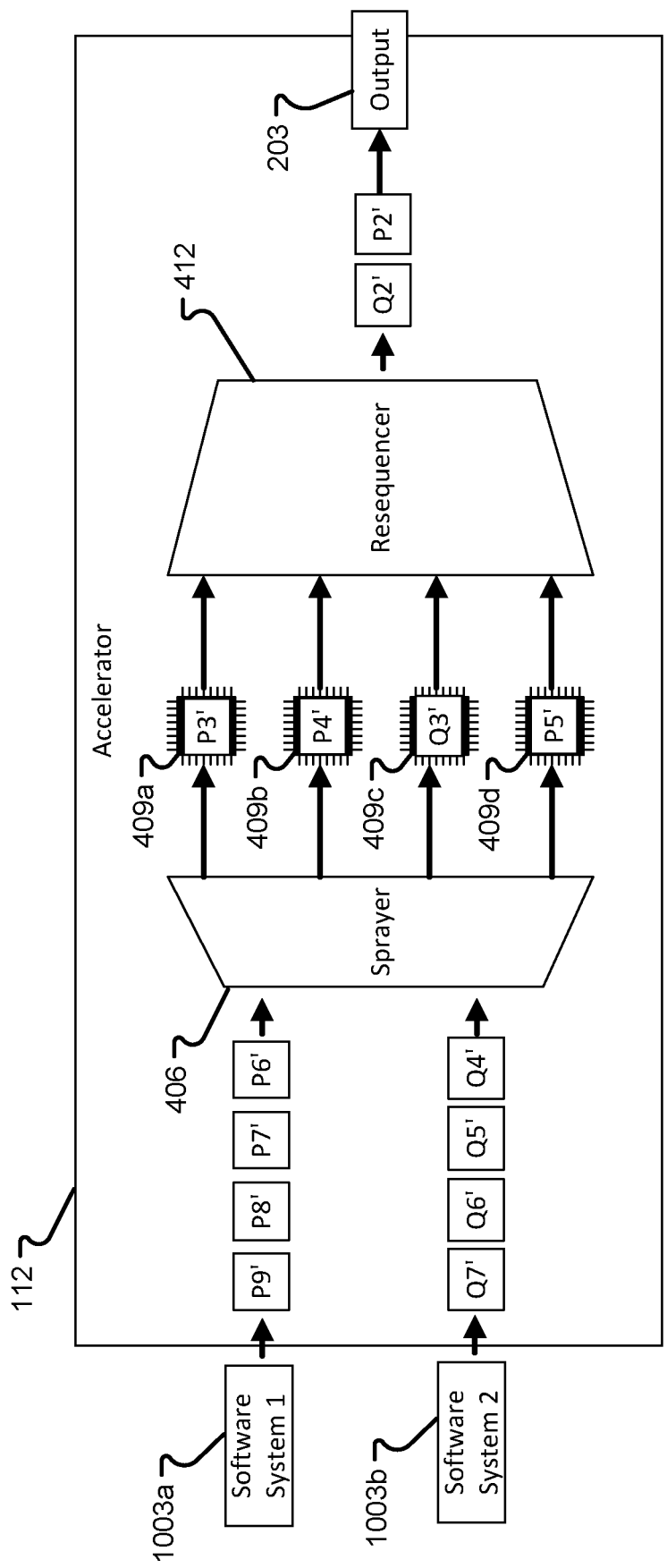
FIG. 10 is a block diagram of an accelerator in accordance with one or more of the embodiments described herein.

In FIG. 10, an accelerator 112 receives packets from a first software system 1003*a* and a second software system 1003*b*. The packets received from the first software system 1003*a* may be considered as being of a single flow P. The packets received from the second software system 1003*b* may be considered as being of a single flow Q. It should be appreciated that the packets of flow P may or may not be directed to the same destination. Similarly, it should be appreciated that the packets of flow Q may or may not be directed to the same destination. In some embodiments, a flow may refer to all packets received from a particular software system 1003*a*, 1003*b*, while in other embodiments, a flow may refer to packets with a common destination address, software process, or another common characteristic.

In the example illustrated in FIG. 10, each software system 1003*a*, 1003*b*, provides the accelerator with packets already labeled with information identifying a flow and a sequence number. For example, software may use multiple cores to generate streams of packets and the resequencer as described herein may be used to order the packets, even without using a sequencer prior to the packets being processed.

While the accelerator 112 of FIG. 10 provides one output 203 which outputs the combined P and Q flows, it should be appreciated in some embodiments the two flows may be output to separate outputs.

After being received from one of the first and second software systems 1003*a*, 1003*b*, each packet is handled by a sprayer 406 which directs the packet to a particular processing core 409*a-d*. As illustrated in FIG. 10, a first core 409*a* is processing a packet P3', a second core 409*b* is processing a packet P4', a third core 409*c* is processing a packet Q3', and a fourth core 409*d* is processing packet P5'.

After each core 409*a-d* finishes processing each packet, the packets are resequenced by a resequencer 412. The resequencer 412 determines, based on the information included in each packet as received from the software systems 1003*a*, 1003*b*, an order and a flow for each packet. In the example illustrated in FIG. 10, the resequencer 412 identifies both an order number for each packet and a flow associated with the packet. Based on this identification, the resequencer outputs, in order, packets of the P flow and the Q flow to the output 203. For example, in the beginning the resequencer 412 may hold P1' or P2' until P0' is received and output and may hold Q1' or Q2' until Q0' is received and output. After outputting P0', the resequencer 412 may hold any packets of the P flow other than P1'. In this way, the packets are output from the accelerator 112 in the same order and the same flow as received.

Figure 11:
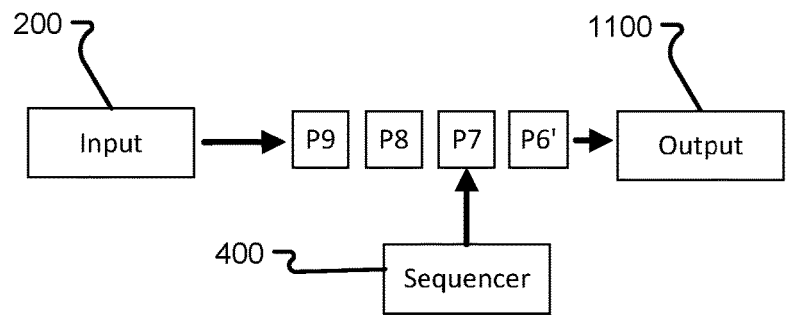
FIG. 11 is a block diagram of a system including a sequencer in accordance with one or more of the embodiments described herein.

As illustrated in FIG. 11, a sequencer 400 as described herein may be used as a standalone device without requiring a sprayer, a set of processing cores, or a resequencer. Similarly, as illustrated in FIG. 12, a resequencer 412 as described herein may be used as a standalone device without requiring a sequencer, a sprayer, or a set of processing cores.

As illustrated in FIG. 11, a sequencer 400 may be used to append a sequence number and/or a flow identifier or sequencer ID to a flow of packets being transmitted from an input 203 to an output 1100. Such a sequencer 400 may be used, for example, to sequence packets which are being stored in a queue or memory. A sequencer 400 as illustrated in FIG. 11 may be useful to avoid the possibility of packets becoming out-of-order for any reason, not only due to multi-core processing, but for other reasons.

Figure 12:
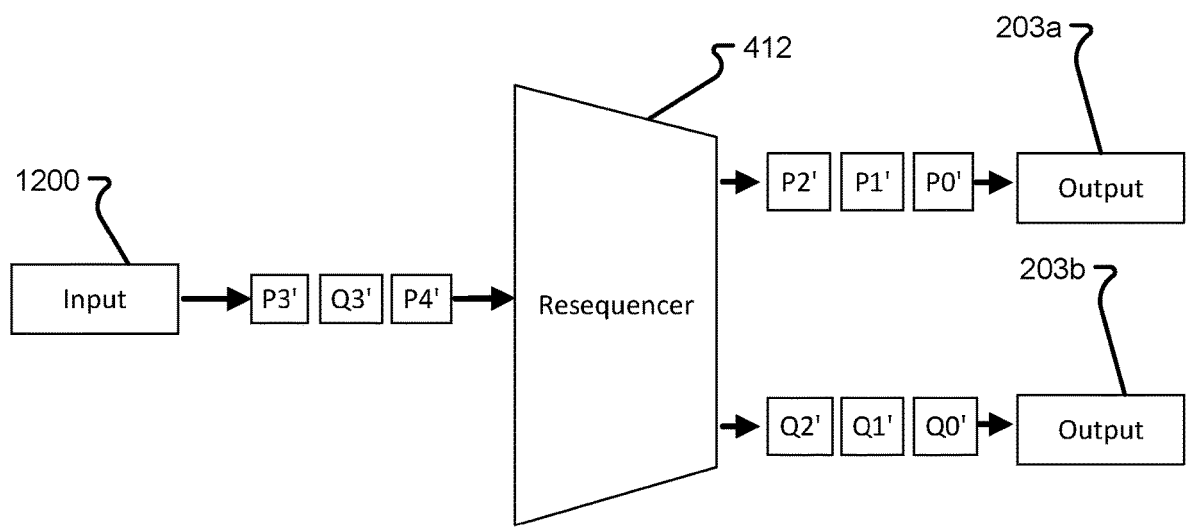
FIG. 12 is a block diagram of a system including a resequencer in accordance with one or more of the embodiments described herein.

As illustrated in FIG. 12, a resequencer 412 may be used to resequence packets which include identifying information such as information which may have been previously added by a sequencer or a software system as described herein. The resequencer 412 may receive one or more flows of packets from one or more inputs 1200, such as queues or memory. The flows of packets may be mixed or the packets from the input 1200 may relate to a single flow. As illustrated in FIG. 12, the resequencer 412 accepts a single input 1200 including packets from two flows, P and Q, and provides two outputs, 203*a*, 203*b*. The resequencer 412 effectively separates and sequences flows P and Q and provides the packets of flow P in order to the first output 203*a* and the packets of flow Q in order to the second output 203*b*. A resequencer 412 as illustrated in FIG. 12 may be useful to provide resequencing for any packets stored in data or for any stream or flow of packets in which the packets include information which can be used to resequence the packets such as the sequencer ID, sequence number, or other information as described herein.

The present disclosure encompasses embodiments of the method 500 that comprise more or fewer steps than those described above, and/or one or more steps that are different than the steps described above.

The present disclosure encompasses methods with fewer than all of the steps identified in FIG. 5 (and the corresponding description of the method 500), as well as methods that include additional steps beyond those identified in FIG. 5 (and the corresponding description of the method 500). The present disclosure also encompasses methods that comprise one or more steps from one method described herein, and one or more steps from another method described herein. Any correlation described herein may be or comprise a registration or any other correlation.

Embodiments include a multi-core processing system, the system comprising: a first hardware sequencer that: identifies a flow order for a plurality of received packets; and generates metadata for at least some of the plurality of received packets based on the identified flow order, the metadata indicating a sequence number for a respective packet; a hardware sprayer that distributes the plurality of received packets among a plurality of processing cores; and a second hardware sequencer that: receives packets from the plurality of processing cores; and sequences the packets based on the metadata generated by the first hardware sequencer.

Aspects of the above system include wherein the received packets are generated by software executed by the system. Aspects of the above system include wherein the first hardware sequencer sequences the plurality of received packets. Aspects of the above system include wherein the first hardware sequencer is programmed to identify flows based on data in each packet. Aspects of the above system include wherein the metadata further indicates a flow associated with the respective packet. Aspects of the above system include wherein the second hardware sequencer sequences packets with metadata indicating a particular flow and does not sequence packets without metadata indicating the particular flow. Aspects of the above system include wherein the metadata further indicates the first hardware sequencer. Aspects of the above system include wherein the second hardware sequencer sequences packets with metadata indicating the first hardware sequencer and does not sequence packets without metadata indicating the first hardware sequencer. Aspects of the above system include wherein the packets received by the second hardware sequencer were sent to the plurality of processing cores by a plurality of hardware sequencers, wherein each packet identifies a respective hardware sequencer. Aspects of the above system include wherein the second hardware sequencer sequences packets with metadata indicating the first hardware sequencer separate from packets with metadata indicating a hardware sequencer other than the first hardware sequencer. Aspects of the above system include wherein the sprayer distributes the plurality of received packets across the plurality of processing cores. Aspects of the above system include wherein the second hardware sequencer outputs the first packet to a host device.

Embodiments include a DPU, comprising: a first hardware sequencer that: identifies a flow order for a plurality of received packets; and generates metadata for at least some of the plurality of received packets based on the identified flow order, the metadata indicating a sequence number for a respective packet; a hardware sprayer that distributes the plurality of received packets among a plurality of processing cores; and a second hardware sequencer that: receives packets from the plurality of processing cores; and sequences the packets based on the metadata generated by the first hardware sequencer.

Aspects of the above DPU include wherein the received packets are generated by software executed by the system. Aspects of the above DPU include wherein the first hardware sequencer sequences the plurality of received packets. Aspects of the above DPU include wherein the first hardware sequencer is programmed to identify flows based on data in each packet. Aspects of the above DPU include wherein the metadata further indicates a flow associated with the respective packet. Aspects of the above DPU include wherein the second hardware sequencer sequences packets with metadata indicating a particular flow and does not sequence packets without metadata indicating the particular flow.

Embodiments include a networking device, comprising: a first hardware sequencer that: identifies a flow order for a plurality of received packets; and generates metadata for at least some of the plurality of received packets based on the identified flow order, the metadata indicating a sequence number for a respective packet; a hardware sprayer that distributes the plurality of received packets among a plurality of processing cores; and a second hardware sequencer that: receives packets from the plurality of processing cores; and sequences the packets based on the metadata generated by the first hardware sequencer.

Embodiments include a system for processing packets, the system comprising: a hardware sequencer that: identifies a flow order for a plurality of received packets; and generates metadata for at least some of the plurality of received packets based on the identified flow order, the metadata indicating a sequence number for a respective packet; and a hardware sprayer that distributes the plurality of received packets among a plurality of processing cores.

Embodiments include a system for resequencing packets, the system comprising a hardware sequencer that: receives packets from a plurality of processing cores; determines a flow and a sequence number for each packet among the plurality of packets; determines a first packet corresponds to a next packet in a sequence; and in response to determining the first packet is the next packet in the sequence, outputs the first packet.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A multi-core processing system, the system comprising:
   a first hardware sequencer that:
      identifies a flow and an order for a plurality of received packets; and
      generates metadata for at least some of the plurality of packets based on the identified flow and the order, the metadata indicating the flow and a sequence number for a respective packet;

a hardware sprayer that distributes the plurality of packets among a plurality of processing cores; and a second hardware sequencer that:
- receives a first plurality of packets and a second plurality of packets from the plurality of processing cores; and
- based on the metadata indicating the flow:
  - sequences the first plurality of packets in an order based on the sequence number; and
  - outputs the second plurality of packets in an order in which the second plurality of packets were received by the second hardware sequencer.

2. The system of claim 1, wherein the packets are generated by software executed by the system.

3. The system of claim 1, wherein the first hardware sequencer sequences the plurality of packets prior to the hardware sprayer distributing the plurality of packets among the plurality of processing cores.

4. The system of claim 1, wherein the second hardware sequencer sequences packets with metadata indicating a first flow and outputs packets with metadata indicating a second flow in an order in which the packets with metadata indicating the second flow were received.

5. The system of claim 1, wherein the metadata further indicates the first hardware sequencer.

6. The system of claim 5, wherein the second hardware sequencer sequences packets with metadata indicating the first hardware sequencer and outputs packets with metadata indicating a third hardware sequencer in an order in which the packets with metadata indicating the third hardware sequence were received.

7. The system of claim 5, wherein the packets received by the second hardware sequencer were sent to the plurality of processing cores by a plurality of hardware sequencers, wherein each packet identifies a respective hardware sequencer.

8. The system of claim 7, wherein the second hardware sequencer sequences packets with metadata indicating the first hardware sequencer separate from packets with metadata indicating a hardware sequencer other than the first hardware sequencer.

9. The system of claim 1, wherein the hardware sprayer distributes the plurality of packets across the plurality of processing cores.

10. The system of claim 1, wherein the second hardware sequencer outputs the first plurality of packets to a host device.

11. A data processing unit, comprising:
a first hardware sequencer that:
- identifies a flow and an order for a plurality of received packets; and
- generates metadata for at least some of the plurality of packets based on the identified flow and the order, the metadata indicating the flow and a sequence number for a respective packet;

a hardware sprayer that distributes the plurality of packets among a plurality of processing cores; and a second hardware sequencer that:
- receives a first plurality of packets and a second plurality of packets from the plurality of processing cores; and
- based on the metadata indicating the flow:
  - sequences the first plurality of packets in an order based on the sequence number; and
  - outputs the second plurality of the packets in an order in which the second plurality of packets were received by the second hardware sequencer.

12. The data processing unit of claim 11, wherein the packets are generated by software executed by the data processing unit.

13. The data processing unit of claim 11, wherein the first hardware sequencer sequences the plurality of packets prior to the hardware sprayer distributing the plurality of packets among the plurality of processing cores.

14. The data processing unit of claim 13, wherein the second hardware sequencer sequences packets with metadata indicating a first flow and outputs packets with metadata indicating a second flow in an order in which the packets with metadata indicating the second flow were received.

15. A networking device, comprising:
a first hardware sequencer that:
- identifies a flow and an order for a plurality of received packets; and
- generates metadata for at least some of the plurality of packets based on the identified flow and the order, the metadata indicating the flow and a sequence number for a respective packet;

a hardware sprayer that distributes the plurality of packets among a plurality of processing cores; and a second hardware sequencer that:
- receives a first plurality of packets and a second plurality of packets from the plurality of processing cores; and
- based on the metadata indicating the flow:
  - sequences the first plurality of packets in an order based on the sequence number; and
  - outputs the second plurality of packets in an order in which the second plurality of packets were received by the second hardware sequencer.

16. The networking device of claim 15, wherein the packets are generated by software executed by the networking device.

17. The networking device of claim 15, wherein the first hardware sequencer sequences the plurality of packets prior to the hardware sprayer distributing the plurality of packets among the plurality of processing cores.

18. The networking device of claim 15, wherein the second hardware sequencer sequences packets with metadata indicating a first flow and outputs packets with metadata indicating a second flow in an order in which the packets with metadata indicating the second flow were received.

19. The networking device of claim 15, wherein the metadata further indicates the first hardware sequencer.

20. The networking device of claim 19, wherein the second hardware sequencer sequences packets with metadata indicating the first hardware sequencer and outputs packets with metadata indicating a second hardware sequencer in an order in which the packets with metadata indicating the second hardware sequence were received.

* * * * *